Inventor
C. H. Bottoms
By Glascock Downing Seebold
Attys.

Sept. 15, 1959   C. H. BOTTOMS   2,903,852
CONTROL MEANS FOR ROAD VEHICLE HYDRAULIC POWER TRANSMISSION SYSTEMS
Filed Oct. 29, 1956   2 Sheets-Sheet 2

Inventor
C. H. Bottoms
By Glascock Downing Seebold
Attys.

United States Patent Office 2,903,852
Patented Sept. 15, 1959

2,903,852

CONTROL MEANS FOR ROAD VEHICLE HYDRAULIC POWER TRANSMISSION SYSTEMS

Charles Herbert Bottoms, Toronto, Ontario, Canada, assignor to Joseph Lucas (Industries) Limited, Birmingham, England Application October 29, 1956, Serial No. 618,903

2 Claims. (Cl. 60—53)

This invention relates to hydraulic power transmission systems for road vehicles, of the kind including a variable-delivery and reversible pump, and a pair of motors for connection either in series or in parallel to the driven road wheels.

The object of the invention is to provide improved means for controlling the action of the system.

The invention comprises a liquid operated servo-mechanism for controlling the pump, valves for controlling the series-parallel connection between the pump and motors, and a manually operable means for controlling both the servo-mechanism and the said valves.

The invention also comprises servo-operated valve mechanisms for effecting a differential action of the motors when operating in series.

Figure 1:
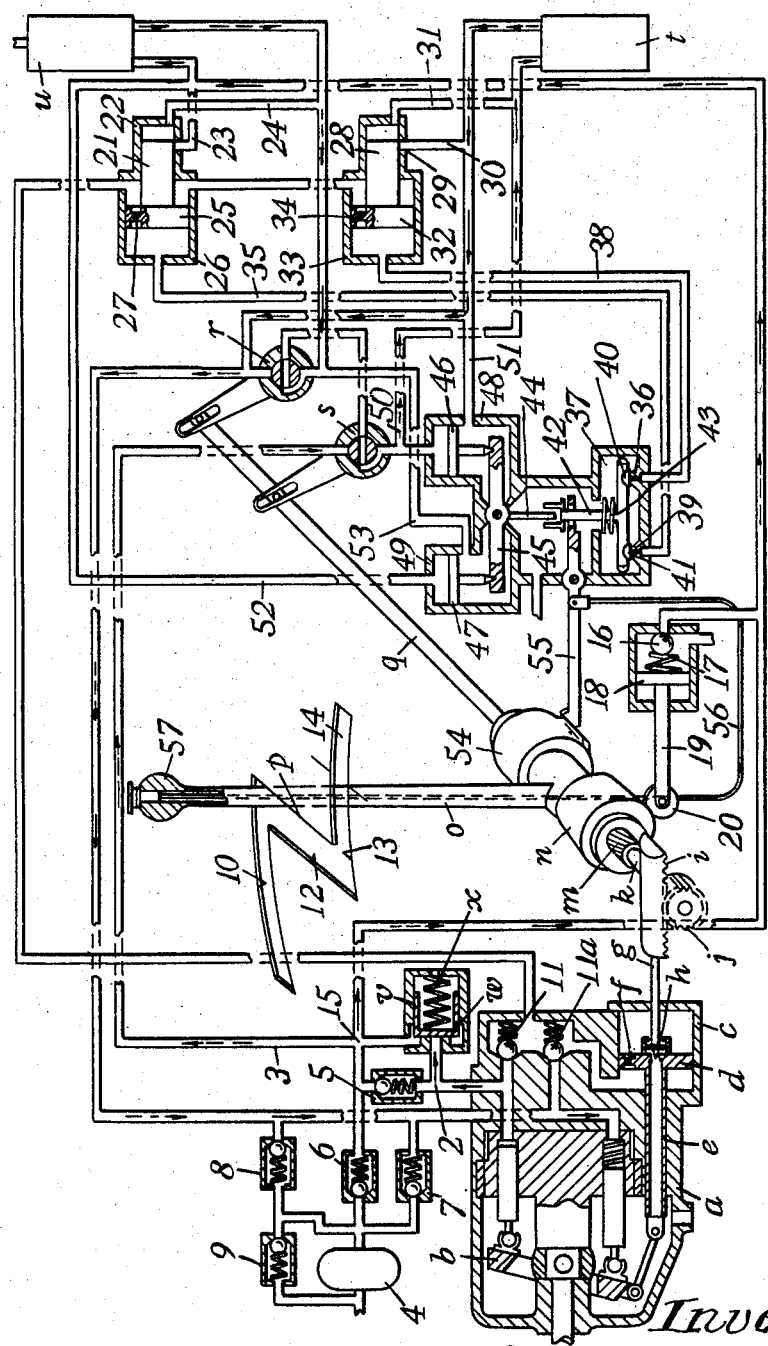
Figure 2:
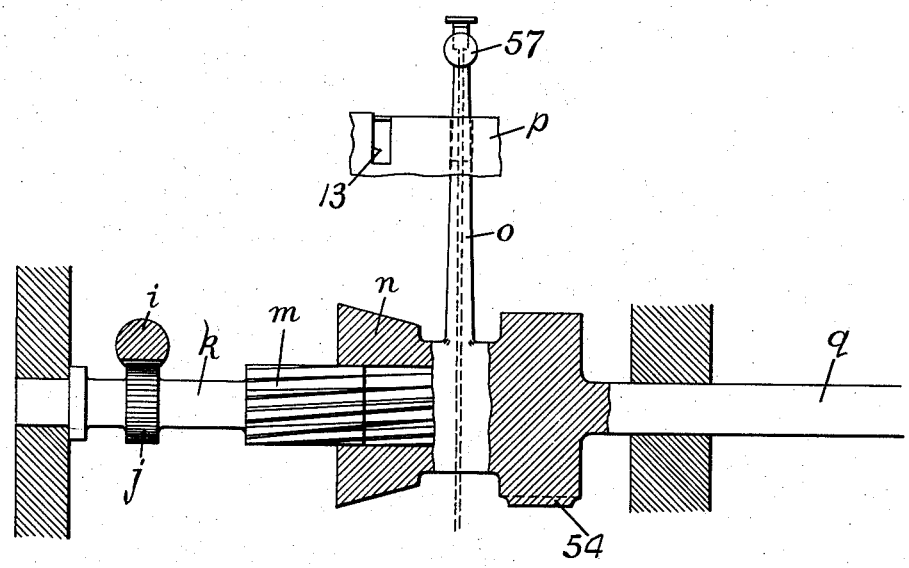

In the accompanying drawings, Figure 1 illustrates diagrammatically a system embodying the invention, and Figure 2 is a fragmentary sectional view of parts of the manually operable means.

Referring to the drawings, the system there shown, includes a variable delivery pump $a$ of the swash plate type, the actuation of the swash plate $b$ for controlling the output of the pump and for reversing the action of the pump being effected by means of a liquid-operated servo-mechanism. The said mechanism comprises a cylinder $c$ containing a piston $d$ from which extends a rod $e$ connected to the swash plate. The two ends of the cylinder are in communication with each other through a restricted orifice $f$ in the piston (or alternatively in the cylinder wall) and the piston and rod have formed therein a bore which serves as a vent passage through which motive liquid can pass to the pump housing and thence to a sump from the end of the cylinder remote from that at which the motive liquid is admitted. For controlling the flow through the vent passage there is provided on one end of a slidable rod $g$ a closure member $h$ which co-operates with the entrance end of the passage.

For actuating the rod $g$ it has formed on or secured to its outer end a toothed rack $i$ which engages a pinion $j$ and the pinion is formed on or secured to a shaft $k$ on which is formed a quick-pitch screw thread $m$. The screw thread engages an internally threaded bore in a cam $n$ to which is attached the driver's control lever $o$, the latter being arranged to extend through a suitably shaped gate $p$. To the cam is attached a slidable rod $q$ which by longitudinal movement serves to actuate a pair of valves $r$ and $s$ whereby the motors $t$ and $u$ can be connected to the pump in series or in parallel.

The pump is connected to a control valve which includes a closure member in the form of a piston $v$ adapted at one end to co-operate with a seating $w$ in one end of a cylinder, the closure member being urged towards the seating by a spring $x$. The cylinder is connected to the pump by a passage 2 and to pipes leading to the motors by a passage 3. Replenishment of the system is effected by a pump 4 through spring-loaded valves 5, 6 and 7. Relief valves 8 and 9 are also provided as shown.

Assuming that the hand lever $o$ is in the position shown, the motors are in this condition connected in series through the valves $r$ and $s$, as will appear later. Movement of the lever along the slot 10 in the gate $p$ will (through the action of the pinion $j$ and rack $i$) move the rod $g$ and closure member $h$ to the left, so causing the piston $d$ to move in the same direction for increasing the obliquity of the swash plate $b$ and thereby increasing the pump output, the motive liquid being admitted from the pump to the left hand end of the servo cylinder $c$ through the spring-loaded non-return valve 11. Return movement of the lever along the slot 10 will be accompanied by return movement of the piston $d$ for reducing the pump output.

Movement of the lever $o$ along the transverse slot 12 in the gate will cause the cam $m$ to slide along the screw $k$ and so cause the pinion $j$ to increase the obliquity of the swash plate $b$. At the same time the accompanying longitudinal movement of the rod $q$ will turn the valves $r$ and $s$ through 90°, so causing the motors $t$ and $u$ to be connected in parallel. Subsequent movement of the lever $o$ along the slot 13 to the neutral position marked 14 (Figure 1) will reduce the obliquity of the swash plate to zero, the pump being then inoperative. Movement of the lever in the same direction beyond the neutral position will impart an opposite obliquity to the swash plate so causing the action of the pump and motors to be reversed. In this condition liquid is then supplied to the servo cylinder through the valve 11$a$.

Reverting now to the condition in which the lever $o$ occupies the position shown in the drawing or in any position along the slot 10, the motive liquid from the pump on reaching the point 15 in the pipes leading to the motor $u$ will flow in the direction of the full-line arrows. From this motor the liquid will flow to the two valves $r$ and $s$ in the direction of the full-line arrows and thence to the motor $t$. From $t$ the liquid will return to the pump along the path which is also indicated by full-line arrows.

When the lever $o$ is moved along the gate slot 12 to a position at the entrance end of the gate slot 13, the valves having been turned through 90° as above mentioned for connecting the motors in parallel, the flow path of the motive liquid along the pipes is indicated by the dotted-line arrows.

Starting at the point 15 the liquid divides into two streams. One of these streams passes through the valve $s$ and thence to the motor $t$. From this motor the liquid returns to the pump along the path indicated by dotted arrows. The other stream flows from the point 15 directly to the motor $u$ and returns to the pump through the valve $r$ as indicated by the dotted arrows. When the lever $o$ is moved beyond the neutral point 14 in the gate slot 13 for reversing the action of the pump, the liquid flows to and from the motors in the opposite direction to those indicated by the dotted lines.

Preferably there is combined with the system a non-return relief valve which includes a closure member 16, the latter being loaded by a spring 17. One end of the spring is supported by a slidable abutment 18 which is secured to a rod 19 having at one end a roller 20 which co-operates with the cam $n$, the latter being tapered in the direction of its length. Actuation of this cam by the lever $o$ both in the axial direction and angularly varies the position of the abutment 18 and so varies the force of the spring acting on the closure member 16.

In addition to the means above described it is preferred to incorporate in the system means for enabling a differential action to be obtained at the driven road wheels when the motors are connected in series, so as to enable the motors to operate at different speeds when the vehicle is travelling around a bend in the road. For this purpose there is provided in association with each motor a normally-closed by-pass valve. The valve associated with the motor $u$ comprises a piston 21 slidable in a cylinder 22. The piston normally closes a by-pass pipe 23 connected to the entrance of the motor $u$, and the adjacent end of the cylinder 22 is connected to the motor outlet by a pipe 24. One end of the piston 21 is connected to a servo piston 25 slidable in a cylinder 26, the two ends of the latter being in communication with each other through a restricted orifice 27 in the piston (or in the cylinder wall). A similar by-pass valve is provided in association with the motor $t$ and comprises a piston valve 28 slidable in a cylinder 29, but in this case the piston controls a pipe 30 connected to the outlet of the motor $t$, the inlet of this motor being connected to the cylinder 29 by a pipe 31. The piston 28 is connected to a servo piston 32 contained in a cylinder 33, and in the piston 32 (or the cylinder wall) is formed a restricted orifice 34.

The servo cylinder 26 is connected by a pipe 35 to a vent seating 39 in a chamber 37, and the servo cylinder 33 is connected by a pipe 38 to a vent seating 36. The closure members 40 and 41 respectively acting on the vent seatings 36 and 39 are carried by a T-shaped lever 42 which is loaded by a spring 43. The stem of the lever 42 is engaged by a stem 44 extending from a centrally pivoted lever 45, the opposite ends of which are acted on by pistons 46 and 47 contained in cylinders 48 and 49. At positions located at opposite sides of the piston 46, the cylinder 48 is connected by pipes 50 and 51 to the inlet and outlet respectively of the motor $t$. Likewise the cylinder 49 is connected by pipes 52 and 53 to the inlet and outlet of the motor $u$.

The arrangement is such that so long as both motors are performing equal duties, both of the valves 21 and 28 occupy the positions shown in which they close the pipes 23 and 30, and the pistons 46 and 47 will be subject to equal liquid pressure differences. Thus, the piston 47 is subject at its upper and lower sides respectively to the liquid pressures at the inlet and outlet of the motor $u$, whilst the piston 46 is subject at its upper and lower sides respectively to the liquid pressures at the inlet and outlet of the motor $t$, and as the pressure drops across the motors are equal under normal conditions when the motors are interconnected in series, it follows that the pressure differences acting on the pistons 46 and 47 are also equal. For example, if the liquid is supplied to the inlet of the motor $u$ at 2,000 pounds per square inch, and the pressure drop across each of the motors $u$ and $t$ is 1,000 pounds per square inch, then the piston 47 will be subject at its upper side to a pressure of 2,000 pounds per square inch, and at its lower side to a pressure of 1,000 pounds per square inch, whilst the piston 46 will be subject at its upper side to a pressure of 1,000 pounds per square inch, and at its lower side to practically no liquid pressure. Consequently, each of the pistons 46 and 47 will be subject to a pressure difference of 1,000 pounds per square inch. In other words the pistons will, as indicated above, be subject to equal liquid pressure differences. But in the event of the motors being unequally loaded, as when the vehicle is rounding a bend in the road, the liquid pressure difference acting on one of the pistons (46 and 47) will exceed the pressure difference acting on the other. This will result in tilting of the lever 42, causing one of the vents (36 and 41) to be opened so causing the associated valve (21 or 28) to by-pass motive liquid from the motor which is carrying the lighter load. It is also preferable to arrange for the vent-controlling lever 42 to be operable when the lever is in the slot 12 of the gate. This can be effected by the provision of an additional cam 54 connected to the lever $o$, which cam is so shaped that when the lever $o$ is being moved from the slot 10 to the slot 13 or vice versa it causes a lever 55 to lift both of the closure members 40 and 41. This serves to take the load off the motors $t$ and $u$ while the connections thereof with the pump $a$ are being changed from series to parallel or vice versa, during which change the output of the pump is doubled or halved. Alternatively or in addition the vent lever 55 may be operable by the driver at any time by a flexible cable 56 connected to a knob 57 carried by the lever $o$.

Having thus described my invention what I claim as new and desire to secure by Letters Patent is:

1. In a hydraulic power transmission system including a variable-delivery and reversible hydraulic pump, a pair of hydraulic motors operable by liquid from said pump, and liquid-conducting means whereby said motors are connectible as required in series or in parallel with said pump, control means comprising in combination a liquid-operable servo-mechansm for controlling the output of said pump, a pair of valves for controlling the series-parallel connections between said pump and motors, and manually operable mechanism including a manually operable first member capable of angular and axial motion, a second member capable of angular motion only and having a quick-pitch helical connection with said first member so that said second member is operable in response to both angular and axial movements of said first member, means whereby said valves are connected to and operable by axial motion of said first member, and means connecting said second member to said servo-mechanism for causing the output of said pump to be varied in response to rotary motion of said second member.

2. A hydraulic power transmission system according to claim 1, in which the control means include a pair of servo-operable by-pass valve mechanisms respectively connected to the motors, and another valve mechanism responsive to liquid pressure differences resulting from unequal loading of the motors for controlling the servo-operable valve mechanisms, and thereby permitting differential action of said motors when the latter are connected in series with the pump.

References Cited in the file of this patent

UNITED STATES PATENTS

| | | |
|---|---|---|
| 2,060,220 | Kennedy | Nov. 10, 1936 |
| 2,243,364 | Trautman | May 27, 1941 |
| 2,493,512 | Vickers | Jan. 3, 1950 |
| 2,541,290 | Robinson | Feb. 13, 1951 |